United States Patent [19]

Solomon

[11] 4,279,201
[45] Jul. 21, 1981

[54] GARMENT RACK SYSTEM

[76] Inventor: Archie Solomon, P.O. Box 395, Roswell, Ga. 30077

[21] Appl. No.: 43,427

[22] Filed: May 29, 1979

[51] Int. Cl.³ .............................................. E01B 25/26
[52] U.S. Cl. ..................................... 104/100; 104/96; 198/473
[58] Field of Search ...................... 104/100, 88, 89, 96, 104/103; 105/156; 198/473, 792

[56] References Cited

U.S. PATENT DOCUMENTS

| | | | |
|---|---|---|---|
| 1,772,047 | 8/1930 | Johnsen | 198/792 |
| 3,011,455 | 12/1961 | Heimann | 104/96 |
| 3,144,836 | 8/1964 | Cripe et al. | 104/103 |
| 3,587,473 | 6/1971 | Weiss et al. | 104/89 |
| 3,734,027 | 5/1973 | Brummett et al. | 104/88 |
| 3,818,836 | 6/1974 | Swilley | 104/100 |
| 4,114,538 | 9/1978 | Nicodemus, Jr. et al. | 104/88 |

FOREIGN PATENT DOCUMENTS 7512076  4/1977  Netherlands ............................. 104/96

Primary Examiner—Joseph F. Peters, Jr.
Assistant Examiner—Ross Weaver
Attorney, Agent, or Firm—Newton, Hopkins & Ormsby

[57] ABSTRACT

An article transport system comprising a plurality of article carrying trolleys which are movably supported by a pair of rollers on a pair of rails suspended within a trailer, the trolleys being stacked on the rails at a diagonal to the longitudinal axes of the rails. Means is provided on the forward portion of the rails to automatically advance one trolley roller onto one rail ahead of the other trolley roller moving onto the other rail in order to facilitate the diagonal stacking of the trolleys.

7 Claims, 7 Drawing Figures

GARMENT RACK SYSTEM

BACKGROUND OF THE INVENTION

1. Field of the Invention

This invention relates generally to article carrying systems and, more particularly, to a method and apparatus for diagonally supporting article carrying trolleys on a pair of rails.

2. Description of the Prior Art

The present invention concerns portable trolleys upon which articles, usually garments, are hung and transported from one location to another. One such segmented trolley system utilized in transferring garments over highways between locations is disclosed in U.S. Pat. No. 3,921,814 wherein a pair of hooks extend upwardly from opposite ends of a hanger rod upon which a set of hangers may be hung, each hook carrying at least one roller for rotation upon a rail supported in a horizontal plane above the hanger rod. In one embodiment of that invention, the rails are mounted from the ceiling of the interior of a truck in spaced, parallel fashion. The garment trolleys are suspended on the rails so that the longitudinal axes of the hanger rods is parallel to the longitudinal axes of the rails with the individual garments thus hanging substantially perpendicular to those axes.

The main disadvantage to that single rail system is the limiting amount of garment trolleys that can be accommodated within the confines of the trailer's interior.

SUMMARY OF THE INVENTION

The above disadvantage is overcome by the present invention which provides for automatically positioning garment trolleys in a diagonal fashion on sets of rails mounted above the trolleys, usually within the interior of a trailer or truck. The system includes the garment trolley substantially as disclosed in U.S. Pat. No. 3,921,814 but modified so that each of its two rollers now independently ride upon a pair of rails, the distance between the rails being less than the length of the trolley. The major portions of the rails are spaced, parallel to each other, the longitudinal axes of each being coplanar within a horizontal plane.

Forward of the main portions of the rails is a means for allowing a first roller of a trolley to engage one of the rails and automatically linking the second roller with the other rail behind the first roller to provide a diagonal stacking arrangement. In the disclosed embodiment, the linking means includes an articulated member which is integrally formed with and projects outwardly from the termination of the main portion of a first rail. The articulated member has a forward rail section that extends beyond the main portion of the second rail and that has a longitudinal axis common with the longitudinal axis of the second rail. An intermediate rail section interconnects the forward rail section and the main portion of the first rail.

A straight linking member is mounted above the articulated member to pivot about a horizontal axis to alternately join together the forward rail sections of the articulated member and the second rail. Weight means is associated with the linking member to automatically move it to a selected position, either in engagement with either the forward rail section or with the main portion of the second rail, depending upon whether the system is being loaded or off-loaded.

In operation, the clothes-laden trolleys are loaded onto the rails by, first, adjusting the weight means on the linking member so that the front of the switching member is pivoted downwardly into engagement with the forward rail section. A first of the trolley rollers engages the forward rail section and is advanced onto the linking member. The weight of the first roller causes the linking member to pivot about its horizontal axis so that the front of the linking member rises out of rolling engagement with the forward rail section and the rear of the linking member comes into contact with the second rail.

The second trolley roller is then placed on the forward rail section and moved along the intermediate rail section to the main portion of the first rail. By that time, the first roller has exited the linking member and is on the second rail. The weight means then causes the linking member to pivot out of engagement with the second rail and return into engagement with the forward rail section in order to receive the next trolley. The first trolley is now disposed at a diagonal to the two rails with the first trolley roller ahead of the second trolley roller. The first trolley is advanced along the two rails to a predetermined position so that the succeeding trolleys can then be Similarly stacked in a diagonal arrangement.

The exit of a trolley from the rail system of the present invention is affected by reversing the above-described process. The weight means is adjusted so that the rear of the linking member is normally in engagement with the second rail when no trolley roller is on the linking member. The second trolley roller is moved along the first rail and across the articulated member. The first trolley roller on the second rail is simultaneously being moved to the juncture of the rear end of the linking member with the main portion of the second rail. As the first roller goes along the linking member, that linking member moves about its pivot axis so that the front end of the member is now in engagement with the forward rail section of the articulated member. The first roller is transferred from the pivoted linking member onto the forward rail section and, thence, completely off of the rail.

A second embodiment of the present invention is for a pair of rails that is adjacent the side wall of a trailer to enable a garment-laden trolley to initially swing more toward the center of the trailer and away from the trailer wall. That insures that the garments will not engage the wall and become damaged while being loaded onto and off of the rails. As disclosed, the particular pair of rails has the second rail bordering the side wall and the forward rail section is disposed between the two rails, its longitudinal axis parallel but not in registry with the longitudinal axis of the second rail. The linking member is S-shaped. The operation of the second embodiment is the same as the first embodiment.

It is, therefore, an object of the present invention to provide a double-rail trolley support system whereby the trolleys may be stacked in a diagonal arrangement.

Another object of the present invention is to provide a unique rail linking mechanism to automatically dispose the trolleys on the rails in a diagonal to the longitudinal axes of the rails.

A still further object of the present invention is to provide a garment transport system wherein the number of transport vehicles is substantially reduced.

DESCRIPTION OF THE PREFERRED EMBODIMENTS

Figure 1:
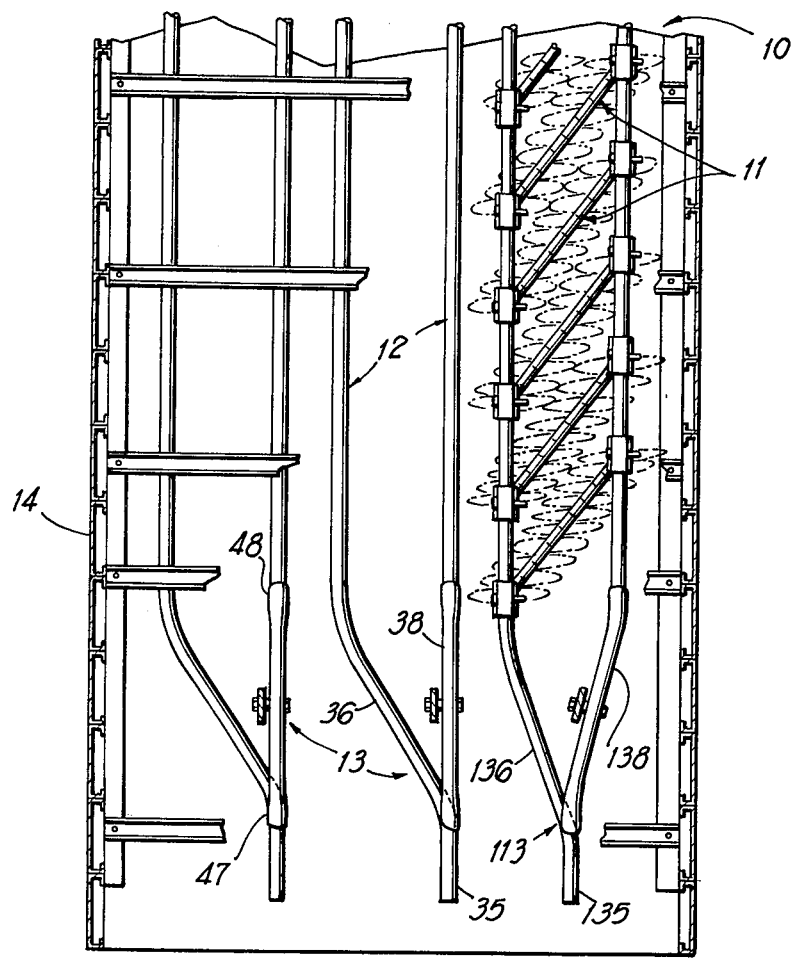
FIG. 1 is a top plan schematic view of a trailer embodying the trolley and rail system of the present invention.

With reference to the drawings, the present invention 10 comprises an article trolley 11, a pair of rails 12 and the first embodiment of the rail linking mechanism 13. Referring to FIG. 1, the interior of a truck trailer 14 is shown having three sets of rails 12 supporting in a diagonal, stacked arrangement, a plurality of similarly constructed trolleys 11 from which hang garments 15.

Figure 2:
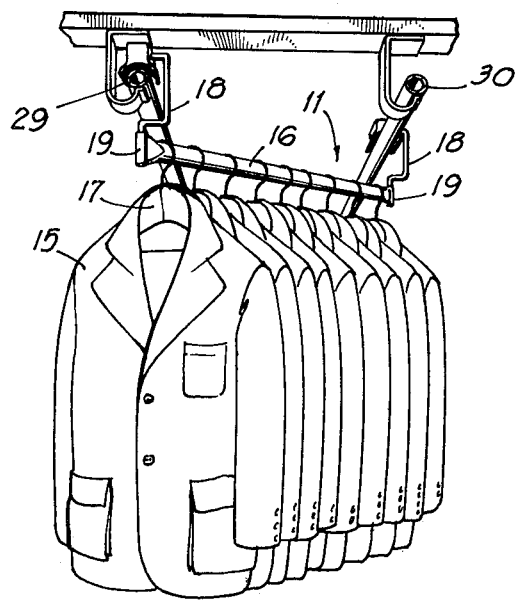
FIG. 2 is a perspective view of a garment-laden trolley on a pair of rails, the rail linking mechanism broken away for clarity.
Figure 3:
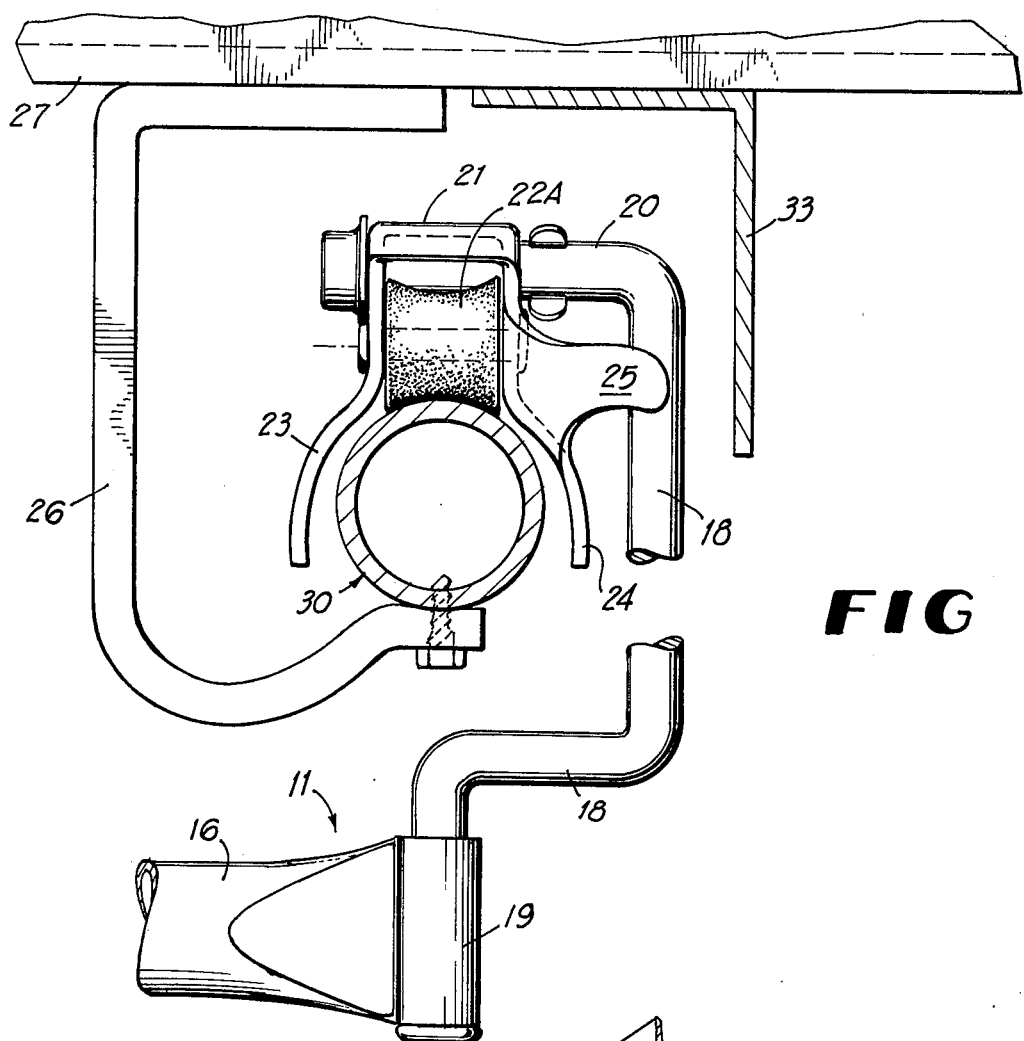
FIG. 3 is a detailed, cross-sectional end view of a trolley roller on a rail.
Figure 4:
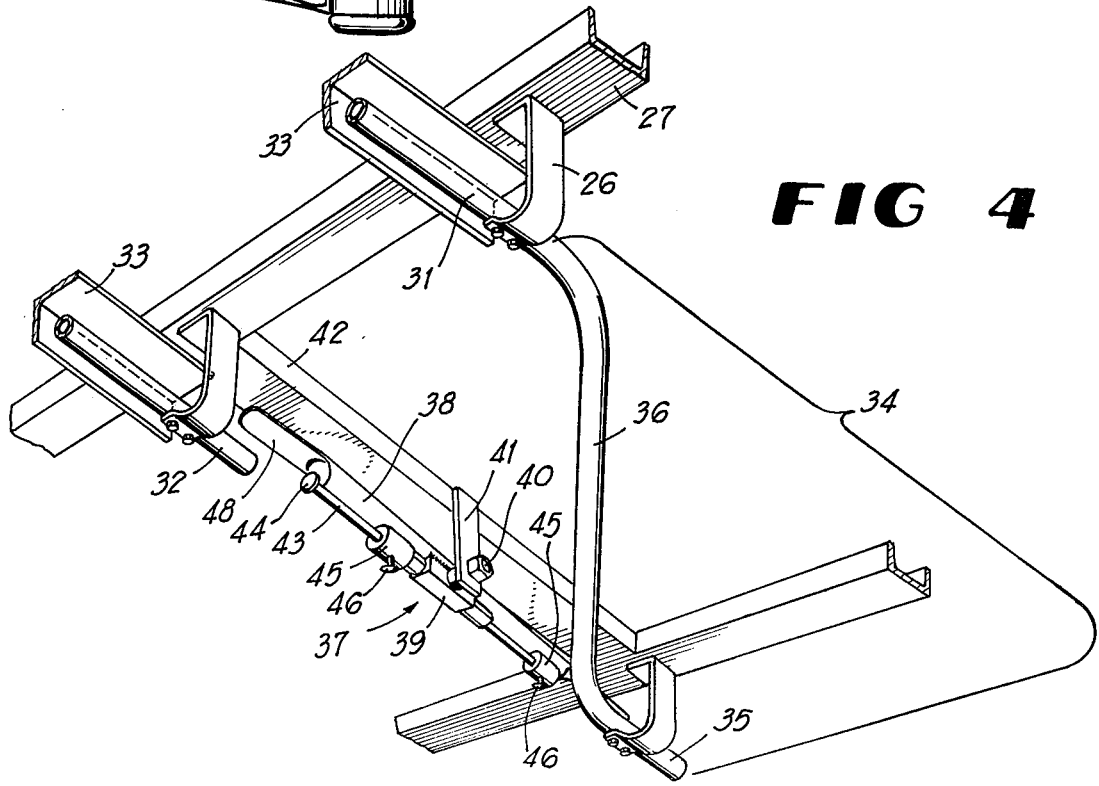
FIG. 4 is a perspective view of the first embodiment of the rail linking mechanism of the present invention.
Figure 5:
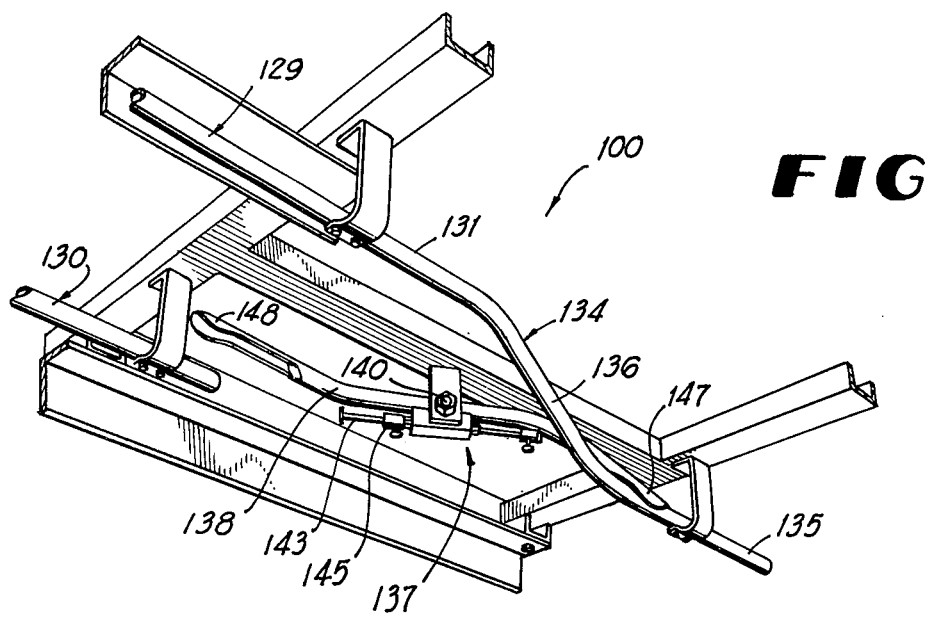
FIG. 5 is a perspective view of the second embodiment of the rail linking mechanism.

As shown in FIG. 2, the trolley 11 includes a hanger rod 16 having a plurality of garment-laden hangers 17 supported therefrom. The rod 16 has a pair of serpentine-shaped hooks 18 extending upwardly, the lower portion of each hook 18 being rotably journaled in a bearing housing 19 integrally formed at the opposite ends of the rod 16. Referring to FIG. 3, the distal end of the hooks 18 includes a horizontally extending arm 20 on which is secured a roller housing 21 having a pair of rollers 22A rotably mounted therein. The pair of rollers positioned on the opposite end of rod are designated 22B. The housing 21 includes opposed, depending arcuate rail guides 23, 24 which overlay the respective rails 12. A lip 25 extends rearwardly and outwardly from arcuate rail guide 24 and guides the hooks 18 and thus, the trolley 11 along the curves in the rails 12, as described in detail hereinbelow. The construction is the same for both pairs of the rollers 22 and their associated housings.

The trolley rails 12 are suspended by G-hooks 26 which depend from a plurality of spaced, laterally extending beams 27 mounted from the ceiling of the trailer 14. As viewed in FIG. 2, the left-hand rail of a set of co-planar rails 12 is numbered as 29 and the right rail is 30. Both rails 29, 30 include straight, parallel, longitudinally extending main portions 31, 32 of equal length. The main portion 32 comprises the entirety of right rail 30. The roller 22A shown in FIG. 3 is mounted on the right rail 30. An inverted L-shaped beam 33 is mounted on beams 27 above the rail main portions 31, 32 to insure that the respective trolley roller housings 21 do not become derailed. The distance between rollers 22A, 22B on a trolley 11 and, thus, the length of rod 16, is greater than the distance between the main portions 31, 32 of a pair of rails 29, 30.

Rail linking mechanism 13 includes an articulated member 34 which is integral with and extends outwardly from rail main portion 31. Member 34 includes straight forward rail section 35 and an S-shaped intermediate section 36 which interconnects forward rail section 35 with main portion 31. Member 34 is in the same plane as rails 29, 30. Front section 35 projects forwardly of rail 30 and is in coaxial alignment therewith.

Rail linking mechanism 13 further includes linking member 37 which selectively connects the forward rail section 35 in operative rail engagement with the main portion 32. Linking member 37 includes a substantially straight rail piece 38 secured to the top of block 39 that is mounted for pivotal movement about the horizontal axis of transverse shaft 40 which is secured to plate 41 that depends from beam 42 which longitudinally extends between a pair of opposed beams 27. The shaft 40 is positioned at the mid-point of rail piece 38. Rod 43 longitudinally extends through block 39 beneath rail piece 38 and includes stops 44 at each of its ends and round weights 45 which are slidably adjustable along rod 43 on both sides of block 39 by means of set screws 46. The weights 45 provide a means of selectively positioning the rail piece, as described hereinafter.

Figure 6A:
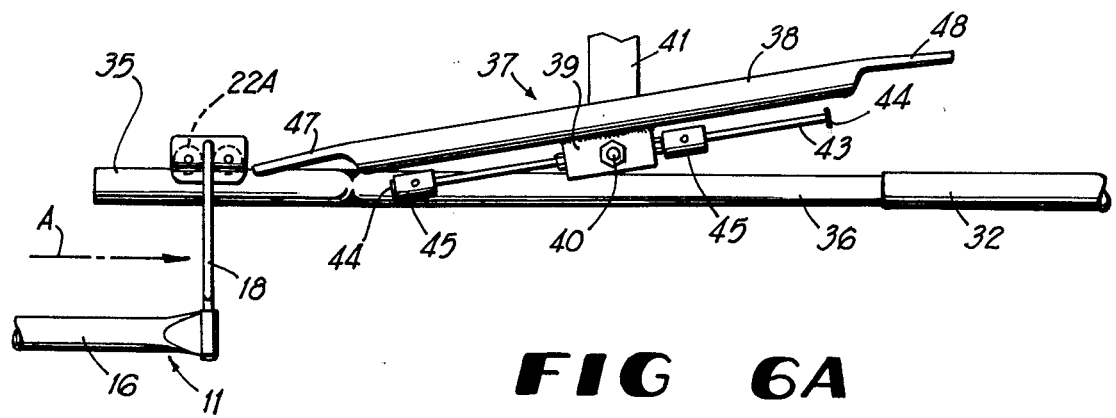
FIGS. 6A and 6B are side elevational views of the embodiment of the rail linking mechanism in operational sequence.
Figure 6B:
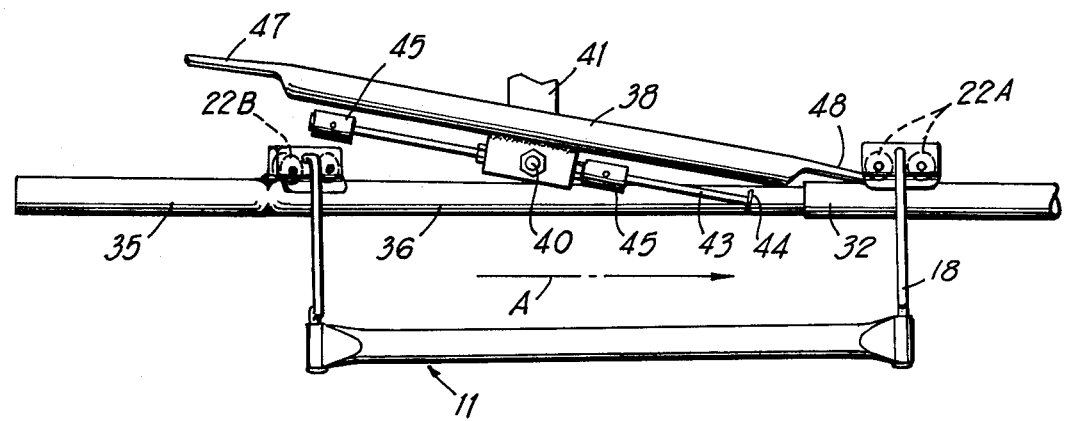

As seen in more detail in FIGS. 6A and 6B, the rail piece 38 includes integrally formed front lip 47 and rear lip 48 which are both arcuate shaped in cross-section. The length of rail piece 38 is such that it extends between the front of main portion 32 and the rear of forward rail section 35, with the underside of front lip 47 capable of being moved to a first position of releasable, mating engagement with forward rail section 35 (FIG. 6A) and the underside of rear lip 48 capable of being moved to a second position of releasable, mating engagement with the front of main portion 32 (FIG. 6B).

As shown in FIG. 1, three pairs of rails 12 are shown mounted within trailer 14. In order for the garment-laden trolleys 11 to be stacked on the pair of rails 12 which are on the far right within trailer 14, as viewed from the rear of trailer 14, without hitting the right-hand trailer side wall, the rail linking means 113 is modified in the second embodiment 100. The distance between the main portions 131, 132 of rails 129, 130 is the same as the distance between main portions 31, 32. As seen in FIG. 1, the longitudinal axis of forward rail section 135 of the second embodiment 100 is not in co-axial alignment with the longitudinal axis of main portion 132. The forward rail section 135 is positioned between the main portions 131, 132 so that intermediate section 136 is not as angled with respect to rail 129 as are intermediate sections 36 with respect to rails 29. The rail piece 138 is S-shaped so as to join the forward rail section 135 with the main portion 132 of rail 130. The rail piece 138 includes front lip 147 and rear lip 148. Shaft 140 extends through plate 141 and is journaled through housing 139 to allow rail piece 138 to pivot about a horizontal axis. Rod 143 longitudinally extends through housing 139 and includes a pair of weights 145 slidably received thereon.

OPERATION

In loading the trolleys onto a pair of rails 12, the weights 45 are slid along rod 43 until the forwardmost weight 45 abuts the front stop 44 and the rear weight 45 is adjacent block or housing 39, as shown in FIG. 6A. The positions of the two weights are then set by screws 46. The weights 45 thereby serve to place the rail piece 38 in is first position with front lip 47 in engagement with forward rail section 35 as shown in FIG. 6A. The rear lip 48 is, thus, out of engagement with main portion 32.

The right pair of rollers 22A of trolley 11 is manually placed on the forward rail section 35 and moved in the direction of arrow A over front lip 47 onto rail piece 38. As the right pair of rollers 22A pass over the shaft 40, the weight of the garment-laden trolley 11 overcomes the bias of the weights 45 and the rail piece 38 begins to pivot about shaft 40 so that front lip 47 is lifted out of engagement with forward rail section 35.

As the front lip 47 rises, the left pair of rollers 22B of trolley 11 is then placed on front rail section 35 and advanced along the articulated member 34. Simultaneously, the rear end 48, due to the weight of right rollers 22A and trolley 11, has come into the second position of rolling, mating engagement with the main portion 32 as shown in FIG. 6B, so that the right rollers 22A can be moved over rear lip 48 and onto main portion 32.

The lip 25 causes the roller housing 21 associated with the rollers 22B and, thus, the respective hook 18 to rotate within housing 19 as the pair of rollers 22B negotiate the curves in the articulated member 34. The left pair of rollers 22B is seen in FIG. 6B moving onto the intermediate section 36. The trolley 11, once the pairs of rollers 22A and 22B are on their respective rail main portions 31, 32, is then pushed along to the rear of rails 12. The succeeding trolleys 11 are loaded onto rails 12 as described above until they assume the configuration within the interior of trailer 14 as shown in FIG. 1. Each time the pair of rollers 22A move onto the main portion 32, the linking member 37 pivots about shaft 40 so that front lip 47 again assumes the position as shown in FIG. 6A to await the loading of the next trolley 11.

The trolleys 11 are unloaded in the reverse sequence of steps. The weights 45 are moved on rod 43 so the rear weight is adjacent its respective stop 44 and the front weight 44 is moved adjacent the housing 39. In that manner, the rail piece 38 automatically assumes the position as shown in FIG. 6B. The rollers 22B on the rail 29 are moved across articulated member 34 and the other pair of trolley rollers 22A is, of course, also being simultaneously advanced toward the front of rail 30 and across the rear lip 48 of rail piece 38. As that pair of rollers 22A move along the top of rail piece 38, the front lip 47 begins to pivot downwardly towards engagement with forward rail section 35, which allows the second roller 22 of a trolley 11 to then be removed from the system 10. The rail piece 38 automatically returns to the position shown in FIG. 6B to off-load the next trolley 11.

The operation of the second embodiment 100 is the same as for the first embodiment 10. The only difference is that as the roller that will engage rail 130 moves along rail piece 138, the convoluted shape of rail piece 138 will throw the path of the trolley hanger rod away from the trailer side wall and more towards the center of the trailer. In that manner, the garments on that trolley are moved away from the sidewall of the trailer 14 while that trolley 11 enters and exits the rail transport system.

It is understood, of course, that the articulated member 34 could be integrally connected to the rail 30 instead of rail 29, with the linking member 37 thereby disposed to be in releasable engagement with forward section 35 and rail 29, instead of forward section 35 and rail 30. In that instance, the linking member 137 would be utilized for the left-most pair of rails 12, as seen in FIG. 1 so as to move the garments out of engagement with the left side wall of trailer 14. It is also understood that the linking member 37 or 137 could be moved into its first and second positions by electrical means, rather than counter-weights 45 or 145.

What I claim is:
1. An article carrying system, comprising:
    (a) a trolley for suspending a plurality of articles therefrom;
    (b) a pair of spaced, horizontal rails, said trolley being moveable on said rails;
    (c) means for mounting said rails from an ancillary structure; and
    (d) means for automatically supporting said trolley on a diagonal to the longitudinal axes of said rails, wherein said trolley includes a pair of rollers, each roller capable of being in rolling engagement with one of the rails of said pair of rails, the distance between said rollers being greater than the distance between said rails, said trolley further including a horizontal rod with opposed ends, and a hook extending upwardly adjacent each of said ends, said hook having a lower end rotatably supported on said rod and having a distal end, with said rollers being rotably mounted on said distal ends, and wherein said supporting means includes said rails having main portions which are in parallel, spaced relationship, said main portions terminating in front ends, a first of said rails further including an articulated member integrally connected to and projecting outwardly from the front end of said first rail and having a forward rail section which extends beyond the termination of the main portion of said second rail, the longitudinal axes of said forward rail section and said main portions of said rails being parallel and further having a section interconnecting said forward rail section and said main portion of said first rail, further including means for linking said articulated member with said main portion of the second of said rails, wherein said linking means includes a front end capable of a first position of releasable, mating engagement with said forward rail section of said member and a rear end capable of a second position of releasable, mating engagement with said main portion of said second rail and means for alternately moving said ends into and out of said first and second portions, said linking member being mounted for pivotal movement about a horizontal axis and wherein said moving means includes a weight selectively positioned on said linking member so that said linking member is counter-balanced about said horizontal axis.

2. An improved article carrying system of the type wherein a trolley moveably supports articles thereon from a track means suspended from an ancillary structure, said trolley comprising a rod with a pair of hooks extending upwardly therefrom adjacent each end of the rod, each hook carrying on its upper end at least one roller for rotation upon the track means and being rotably supported about its lower end on the rod, wherein the improvement comprises:
    said track means being comprised of a pair of rails having spaced, horizontal main portions with parallel longitudinal axes; and
    means for automatically supporting said trolley from said main portions so that the longitudinal axis of said rod is diagonal to said longitudinal axes of said main portions,
the length of said rod being greater than the distance between said main portions and wherein said supporting means includes an articulated member that projects outwardly from the main portion of a first of said rails, said member including a forward rail section which extends beyond the second of said rails and which has a longitudinal axis that is co-axial with the longitudinal axis of said second rail and a rail section interconnecting said front rail section with said main portion of said first rail, said supporting means including a means for selectively inking said forward rail section with said main portion of said second rail, and wherein said linking means includes a rail segment that is capable of movement to a first position of releasable, mating engagement with said forward rail section of said member and which is capable of movement to a second position of releaseable, mating engagement with said main portion of said second rail and means for alternately moving said rail segment into and out of the said first and second positions, wherein said rail segment being pivotally mounted for movement about a horizontal axis and wherein said moving means includes a weight capable of being selectively positioned on said linking member so that said linking member is counter-balanced about said horizontal axis into a selected one of said first and second positions.

3. An improvement as claimed in claim 2 wherein said supporting means includes an articulated member that projects outwardly from the main portion of a first of said rails, said articulated member terminating in a forward rail section which has a longitudinal axis that is parallel to and co-planar with said longitudinal axes of said main portions of said rails, said forward rail section being disposed between said rails, and said articulated member including a rail section which is intermediate said forward rail section and said main portion of said first of said rails, said supporting means further including a means for selectively linking said forward rail section with said main portion of the second of said rails.

4. An improvement as claimed in claim 3 wherein linkings means includes a rail piece, means for pivoting said rail piece about a horizontal axis, said rail piece including a front lip dimensioned for rolling engagement with said forward rail section and a rear lip dimensioned for rolling engagement with said main portion of said second rail, said linking means further including means for automatically moving said rail piece about said horizontal axis so that said rail piece is in a selected one of a first position wherein said front lip is in engagement with said forward rail section and a second position wherein said rear lip is in engagement with said main portion of said second rail.

5. An improved article carrying system of the type wherein a trolley moveably supports articles thereon from a track means suspended from an ancillary structure, said trolley comprising a rod with a pair or hooks extending upwardly therefrom adjacent each end of the rod, each hook carrying on its upper end at least one roller for rotation upon the track means and being rotably supported about its lower end on the rod, wherein the improvement comprises:
said track means being comprised of a pair of rails having spaced, horizontal main portions with parallel longitudinal axes; and
means for automatically supporting said trolley from said main portions so that the longitudinal axis of said rod is diagonal to said longitudinal axes of said main portions,
said supporting means including an articulated member that projects outwardly from the main portion of a first of said rails, said articulated member terminating in a forward rail section which has a longitudinal axis that is parallel to and co-planar with said longitudinal axes of said main portions of said rails, said forward rail section being disposed between said rails, and said articulated member including a rail section which is intermediate said forward rail section and said main portion of said first of said rails, said supporting means further including a means for selectively linking said forward rail section with said main portion of the second of said rails, said linking means including a rail piece, means for pivoting said rail piece about a horizontal axis, said rail piece including a front lip dimensioned for rolling engagement with said forward rail section and a rear lip dimensioned for rolling engagement with said main portion of said second rail, said linking means further including means for automatically moving said rail piece about said horizontal axis so that said rail piece is in a selected one of a first position wherein said front lip is in engagement with said forward rail section and a second position wherein said rear lip is in engagement with said main portion of said second rail, and wherein said moving means includes a rod connected rail piece and a weight slideably adjustable along said rod.

6. An improved article carrying system of the type wherein a trolley moveably supports articles thereon keep said trolley comprising a rod with a pair of hooks extending upwardly therefrom adjacent each end of the rod, each hook carrying on its upper end at least one roller for rotation upon the track means and being rotably supported about its lower end on the rod, wherein the improvement comprises:
said track means being comprised of a pair of rails having spaced, horizontal main portions with parallel longitudinal axes; and
means for automatically supporting said trolley from said main portions so that the longitudinal axis of said rod is diagonal to said longitudinal axes of said main portions,
said supporting means including an articulated member that projects outwardly from the main portion of a first of said rails, said articulated member terminating in a forward rail section which has a longitudinal axis that is parallel to and co-planar with said longitudinal axes of said main portions of said rails, said forward rail section being disposed between said rails, and said articulated member including a rail section which is intermediate said forward rail section and said main portion of said first of said rails, said supporting means further including a means for selectively linking said forward rail section with said main portion of the second of said rails, said linking means including a rail piece, means for pivoting said rail piece about a horizontal axis, said rail piece including a front lip dimensioned for rolling engagement with said forward rail section and a rear lip dimensioned for rolling engagement with said main portion of said second rail, said linking means further including means for automatically moving said rail piece about said horizontal axis so that said rail piece is in a selected one of a first position wherein said front lip is in engagement with said forward rail section and a second position wherein said rear lip is in engagement with said main portion of said second rail, said linking means further including a housing, said rail piece being mounted on said housing, a pivot shaft laterally extending from said housing, means for rotably suspending said rail piece from said ancillary structure about said shaft, a rod longitudinally projecting outwardly from said housing and a pair of weights slideably mounted on said rod for adjustment in a selected position thereon, said pivot shaft being intermediate said weights.

7. An article carrying system comprising:
(a) a trolley for suspending a plurality of articles therefrom;
(b) a pair of spaced, horizontal rails, each of said rails having main portions which are in parallel relationship and which terminate in co-planar front ends;
(c) an articulated member integrally connected to and projecting outwardly from a first of said front ends and having a forward rail section which has a longitudinal axis which is parallel to the longitudinal axis of said main portions; and
(d) means for selectively linking said articulated member with the second of said front ends, said trolley being moveable along said pair of rails, said articulated member and said linking means whereby said trolley may be alternately transferred from said forward rail section to said pair of rails and from said pair of rails to said forward rail section by said linking means, wherein said linking means includes a linking element having a front end capable of a first position of releasable, mating engagement with said articulated member and a rear end capable of a second position of releasable, mating engagement with said main portion of said second rail and means for alternately moving said ends into and out of said first and second positions and wherein said linking element is mounted for pivotal movement about a horizontal axis and wherein said moving means includes a weight selectively positioned on said linking member so that said linking member is counter-balanced about said horizontal axis.

* * * * *